United States Patent

Scheibelhoffer et al.

[11] Patent Number: 5,549,929
[45] Date of Patent: Aug. 27, 1996

[54] SCREEN PRINTABLE DECORATIVE COATING COMPOSITION

[75] Inventors: Anthony S. Scheibelhoffer, Norton; Michael J. Berlin, University Heights; Atam P. Sahni, Solon; Dianna B. Dusek, Oakwood Village, all of Ohio; Donald P. Hart, Pittsburgh, Pa.

[73] Assignee: Ferro Corporation, Cleveland, Ohio

[21] Appl. No.: 390,884

[22] Filed: Feb. 17, 1995

[51] Int. Cl.$^6$ .............. B05D 1/32; C08L 67/00
[52] U.S. Cl. ............ 427/282; 427/389.7; 427/393.6; 525/328.8; 525/437; 525/438; 525/453
[58] Field of Search .............. 427/282, 389.7, 427/393.6; 525/438, 328.8, 453, 437

[56] References Cited

U.S. PATENT DOCUMENTS

| | | | |
|---|---|---|---|
| 3,787,340 | 1/1974 | Labana et al. | 260/23 XA |
| 3,879,325 | 4/1975 | Forsberg | 260/29.4 UA |
| 3,919,150 | 11/1975 | Kiel et al. | 260/28.5 R |
| 4,268,554 | 5/1981 | Gras | 427/389.7 |
| 4,843,126 | 6/1989 | Quinn | 525/162 |
| 4,968,751 | 11/1990 | Miles et al. | 525/100 |
| 4,977,214 | 12/1990 | Bagga | 525/109 |
| 5,021,513 | 6/1991 | Bagga | 525/328.8 |
| 5,115,083 | 5/1992 | Piedrahita et al. | 528/230 |
| 5,124,176 | 6/1992 | Marrion | 427/195 |
| 5,202,162 | 4/1993 | Hart, Jr. et al. | 427/282 |
| 5,256,759 | 10/1993 | Kuo | 528/176 |
| 5,346,933 | 9/1994 | Knell | 523/427 |
| 5,358,789 | 10/1994 | Kuo et al. | 428/482 |

FOREIGN PATENT DOCUMENTS

0604815A2  7/1994  European Pat. Off..

*Primary Examiner*—Paul R. Michl
*Assistant Examiner*—Andrew E. C. Merriam
*Attorney, Agent, or Firm*—Rankin, Hill, Lewis & Clark

[57] ABSTRACT

The present invention provides a screen printable coating composition comprising one or more hydroxy functional materials (I), one or more crosslinkers (II) for curing the hydroxy functional materials, and one or more crystalline reactive diluents (III). The coating composition may also include one or more catalysts (IV), plasticizers (V), rheology modifiers (VI), waxes (VII) and coloring agents (VIII). Various additives and fillers may also be included in the coating composition.

6 Claims, No Drawings

SCREEN PRINTABLE DECORATIVE COATING COMPOSITION

FIELD OF INVENTION

This invention concerns a screen printable decorative coating composition for use in decorating glass, ceramic and similar surfaces. More particularly, the present invention concerns a thermosetting screen printable coating composition for use in high-speed decorating of glass, ceramic and other hard surfaces.

BACKGROUND OF INVENTION

The prior art provides various types of coating compositions for use in decorating glass and ceramic surfaces. One well-known class of coating compositions used to decorate glass and ceramic surfaces is commonly referred to as glass enamels. Glass enamels generally comprise one or more glass frits, pigments, fillers and a vehicle. Glass enamels are generally applied by heating the glass enamel to form a flowable dispersion, squeegeeing the dispersion through a masked screen onto the surface to be decorated, and then firing the decorated object to around 1200° F. to drive off the organic constituents of the vehicle and fix the frit and pigment to the surface.

Another class of coating compositions for use in decorating glass and ceramic surfaces is commonly referred to as organic coatings. Generally, organic coatings provide an advantage in that they do not have to be fired at as high of a temperature as glass enamels. An example of a thermoplastic coating composition may be found in Hart, Jr. et al., U.S. Pat. No. 5,202,162. The '162 patent concerns a thermoplastic coating composition comprising a blend of at least two thermoplastic materials. Examples of thermosetting coating compositions may be found in Knell, U.S. Pat. No. 5,346,933 and Kiel, deceased et al., U.S. Pat. No. 3,919,150. The '150 patent discloses a coating composition comprising an acrylic resin containing reactive hydroxyl groups, an ambifunctional aminoplast resin containing reactive hydrogen atoms and an adhesion promoter comprising an ambifunctional epoxy reactive silane. The '933 patent discloses a coating composition comprising a blend of epoxy resins crosslinked with an amine containing crosslinker.

Unfortunately, none of the prior art coating compositions meet the requirements of commercial high-speed, multilayer, screen-applied decorative coating systems.

SUMMARY OF INVENTION

The present invention provides a new and improved thermosetting screen printable coating or ink composition for decorating glass and similar rigid surfaces that provides several distinct advantages over prior art compositions. Such advantages include the ability to reprint or overprint the composition within seconds (or less), a latency of cure that facilitates the use of a screen printing step, and a relatively low viscosity that can be maintained prior to screen printing for extended periods of time. The coating composition of the present invention is especially well suited for use in connection with conventional high-speed glass bottle decorating equipment such as the equipment employed in the food and beverage container industry. The advantages of the coating composition of the present invention are discussed in greater detail below.

Generally, a coating composition made in accordance with the present invention comprises one or more hydroxy functional materials (I), one or more crosslinkers (II) for curing the hydroxy functional materials, and one or more crystalline reactive diluents (III). The coating composition may also include one or more catalysts (IV), plasticizers (V), rheology modifiers (VI), waxes (VII) and coloring agents (VIII). Various additives and fillers may also be included in the coating composition.

The incorporation of the crystalline reactive diluent in the coating composition provides various distinct advantages. Specifically, it allows the use of a higher Tg base resin (which without the use of the crystalline reactive diluent would yield a coating having an excessively high viscosity for these types of coating systems), it provides a separate crystalline phase upon printing that facilitates a quicker "set" subsequent to printing, and it allows for a lower viscosity melt during the printing operation.

In one preferred embodiment the polymeric binder portion of the coating composition comprises in weight percent from about 20% to about 80% hydroxy functional material (I) and from about 20% to about 80% epoxy functional crosslinker (II). Overall the coating composition comprises in weight percent from about 2% to about 40% crystalline reactive diluent (III), from about 20% to about 98% polymeric binder, up to about 10% catalyst (IV), up to about 15% plasticizer (V), up to about 10% rheology modifier (VI), up to about 10% wax (VII), and up to about 60% coloring agent (VIII).

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The various components that comprise a coating composition made in accordance with the present invention are set forth in detail below.

I. Hydroxy Functional Material

The hydroxyl functional matrix polymers (base resin) for coreaction with a crosslinker or curing agent comprise a wide range of materials and is dependent upon the specific intended application of the coating composition.

For a more "flexible" coating one may employ linear or lightly branched polyesters made from linear or cycloaliphatic glycols such as, for example, neopentyl glycol, diethylene glycol, dipropylene glycol, ethylene glycol, 1,6-hexane diol, or cyclohexane dimethanol. These polyesters may be lightly branched with either a triol like trimethylol propane or alternatively a triacid like trimellitic anhydride. Typical polyesters of this type generally have a hydroxyl number of from 35 to around 120 and acid numbers of less than about 14.

When harder, more chemical resistant coating is desired a polyester suitable for use in this invention can be made using mainly polyols which are trifunctional like trimethylol propane or trimethylol ethane. These triols are reacted with aliphatic acids like those discussed herein or aromatic acids like isophthalic or terephthalic acid to yield polyesters with hydroxyl numbers of around 200 to 350 and acid numbers of 2–5. The hydroxyl to carboxyl ratio is around 1:8 to 1.

The polyester can be produced by conventional techniques such as solvent or bulk polymerization, although bulk polymerization is generally preferred. The raw materials can be charged in bulk and esterification polymerized at temperatures typically between from about 190° C. to about 240° C., although moderately higher or lower temperatures can be utilized satisfactorily. An esterification catalyst can be used, typically at less than 1% levels based on charge, such as an organo tin compound (e.g., stannous octoate).

In another aspect of the present invention, the thermosetting coating composition can further contain a functionally reactive acrylic polymer containing hydroxyl groups adapted to be coreactive with a crosslinker or curing agent. Useful acrylic copolymers may be produced by conventional techniques such as, for example, solvent or fusion polymerization of ethylenically unsaturated monomers containing carbon-to-carbon double bond unsaturation including acrylic monomers and hydroxyl functional monomers as well as other ethylenic monomers. The hydroxyl functional monomers include hydroxyl alkyl acrylates and methacrylates such as hydroxyethyl and hydroxypropyl acrylates and methacrylates, as well as amino acrylates and methacrylates, and acrylic and methacrylic acid. Hydroxyl functional monomers include hydroxy alkyl acrylates such as 2-hydroxy ethyl acrylate and methacrylate, 2-hydroxy propyl acrylate and methacrylate, and similar hydroxy lower alkyl acrylates or methacrylates. On a weight basis, the hydroxyl functional acrylate copolymer preferably comprises copolymerized monomers between from about 45% and about 75% acrylic and/or methacrylic monomers, from between about 5% and about 35% hydroxyl functional monomers, with the balance being other ethylenically unsaturated monomers. The other ethylenic monomers may be present on a weight basis in an amount from about 10% to about 30%. Such other ethylenic monomers include for example vinyl monomers, allylic monomers and acrylamide monomers. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methylstyrenes and similar lower alkyl styrenes, chlorostyrene, vinyltoluene, vinylnaphthalene, divinylbenzene, and cyclohexene. Vinyl aliphatic hydrocarbon monomers include alpha olefins such as ethylene, propylene, isobutylene, and cyclohexene as well as conjugated dienes such as 1,3-butadiene, 1,3-piperylene, 2,3-dimethylbutadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl ester of acrylic or methacrylic acid having an alkyl ester portion containing between 1 to 12 carbon atoms as well as aromatic derivatives of acrylic and methacrylic acid. Useful acrylic monomers include for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers react with acrylic and methacrylic acids.

The hydroxyl functional acrylic polymer can be produced by bulk polymerization of ethylenically unsaturated monomers activated by peroxide or azo or other free radical initiator at polymerization temperatures typically between from about 70° C. to about 170° C. and preferably between from about 120° C. to about 150° C. Typically from about 0.5% to about 3% by weight peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred; azo initiators such azo-bis(isobutyronitrile) and dimethylazo-bis(isobutyrates); as well as alkali metal persulfate or ammonium persulfates. Mercaptans can be added at levels of from about 2% to about 4% based on the weight of the monomers to provide copolymers of low molecular weight. Mercaptans are useful in controlling molecular weight and primarily producing low molecular weight polymers, and include for example 2-mercaptoethanol; 1-mercapto- 2-propanol; and 2-hydroxyethyl-3-mercaptopropionate. The number molecular weight of the acrylic copolymer can be between 2,000 and 10,000 as measured by GPC according to ASTM D 3016-72; D3536-76; and D3593-80.

Hydroxyl functional polyurethane polymers can also be employed in the coating composition of the present invention. Hydroxyl functional polyurethane polymers typically contain urethane groups in the polymer backbone and are produced by reacting excess equivalents of diol or polyol with lesser equivalents of di- or polyisocyanate. The polyisocyanates can be di- or triisocyanates such as for example 2,4 and 2,6-tolylene diisocyanate, phenylene diisocyanate; hexamethylene or tetramethylene diisocyanate, 1,5-naphthalene diisocyanate, ethylene or propylene diisocyanate, trimethylene or triphenyl or triphenylsulfone triisocyanate, and similar di- or triisocyanates. The polyisocyanate can be generally selected from the group of aliphatic, cyclo-aliphatic and aromatic polyisocyanates such as for example, hexamethylene, 1,6-diisocyanate, isophorone diisocyanate, 1,4-dimethyl cyclohexane diisocyanate, diphenylmethane diisocyanate, 2,4-tolylene diisocyanate, 2,6-tolylene diisocyanate and mixtures thereof. Useful polyols preferably contain two or more hydroxyl groups for coreaction with the isocyanate groups. Useful polyols are: diols such as ethylene glycol, diethylene glycols, triethylene glycols, propylene glycols, butylene glycols, neopentyl glycol, 1,4-cyclohexane dimethanol, triols such as glycerol, trimethylol propane, and trimethylol ethane as well as low molecular weight polyester polyols and polyether polyols, oxides of polyols; polycaprolactone polyols produced by the addition of monomeric lactones to polyols, such as caprolactone; hydroxy terminated polyesters produced by condensation of any of the above polyols with polybasic acids such acids having from 4 to about 30 carbon atoms and including those acids discussed above in such ration that the final condensate is substantially free from carboxyl acidity and has a molecular weight range up to about 5000.

II. Crosslinker

The coating composition made in accordance with the present invention includes one or more curing agents or crosslinkers. Curing agents or crosslinkers suitable for use in the present invention are those materials capable of reacting with the hydroxyl groups of the hydroxy functional material (I) to form a crosslinked product. Moreover, such curing agents or crosslinkers must display a latent cure so as to not react while held at elevated temperatures during the screen printing operation or step. The curing agents or crosslinkers generally include epoxy resins (polyepoxides), acrylic resins, polyester resins, aminoplastic resins, alkyd resins, phenolic resins, allyl resins, polyfunctional acid or anhydride resins and mixtures of two or more thereof.

Of particular significance are the polyepoxides. The term "polyepoxides" is meant to encompass species having more than one epoxy group per species. For instance, the polyepoxides include epoxy containing resins and molecular species having more than one epoxy group. It will be appreciated that the preferred crosslinker for a particular coating composition made in accordance with the present invention will be heavily dependent on the particular hydroxy functional material(s) (I) that is utilized.

A wide variety of polyepoxides may be utilized in the coating composition of the present invention. Preferably, the polyepoxide should have a 1,2-epoxy equivalency greater than one. Examples of useful polyepoxides are polyglycidyl ethers of aromatic polyols, (e.g., polyphenols). Such polyepoxides can be produced in a conventional manner, for example, by etherification of an aromatic polyol with epichlorohydrin or dichlorohydrin in the presence of an alkali metal hydroxide. The aromatic polyol, preferably a bis(hydroxyaromatic) alkane or a tetrakis(hydroxyaromatic) alkane, may be, for example, bis(4-hydroxyphenyl)-2,2-propane (generally known as bisphenol A), bis(4-hydroxyphenyl)-1,1-ethane, bis(4-hydroxyphenyl)- 1,1-isobutane, bis(4-hydroxy tertiarybutylphenyl)- 2,2-propane, bis(2-hydroxynaphthyl)methane, 4,4'-dihydroxybenzophenone, 1,5-dihydroxynaphthalene and the like. Polyepoxides based on bisphenol A are generally preferred from among the polyglycidyl ethers of aromatic polyols.

Also, suitable as the polyepoxide are polyglycidyl ethers of polyhydric alcohols, such as 1,2-ethanediol, 1,2-propanediol, 1,3-propanediol, 1,4-butanediol, 1,5-pentanediol, diethylene glycol, triethylene glycol, polyethylene glycol, polypropylene glycol and the like. Also suitable would be cycloaliphatic epoxies, such as ERL-4221, available from Union Carbide Corporation, and EHPE-3150 available from Daicel. Other polyepoxides include glycidyl esters of dibasic acids, such as diglycidyl terephthalate, alicyclic polyepoxides such as diglycidyl ethers of hydrogenated bisphenols or (3,4-epoxy-6-methylcyclohexyl)-methyl ester of 3,4-epoxy-6-methyl-cyclohexanecarboxylic acid, and triglycidyl isocyanurate. Generally, the polyepoxides have epoxy equivalent weights from about 100 to 1,000, preferably from about 150 to about 800.

The polyepoxides may also be derivatives of Novalak resins. Examples of Novalak resins include phenol Novalak and Cresol Novalak resins.

In another embodiment, the curing agent or crosslinker is an acrylic resin having functional groups capable of reacting with the hydroxy functional material (I). Such acrylic resins are obtained by polymerizing a suitable combination of a functional group-containing monomer and another copolymerizable monomer in an ordinary manner. Examples of the functional group-containing monomers include carboxyl group-containing monomers such as acrylic acid, methacrylic acid, itaconic acid, maleic acid, fumaric acid, as well as anhydrides or monoesters of maleic acid and fumaric acid with monoalcohols; and epoxy group-containing monomers such as glycidyl methacrylate, glycidyl acrylate and allyl glycidyl ether. The functional group-containing monomer is used in an amount of about 5 to about 40% by weight of total monomers. The copolymerizable monomers are described above in connection with the hydroxyl functional acrylate copolymer as other ethylenic monomers. Various acrylic resins having functional groups as described herein are commercially available.

In another embodiment, the curing agent or crosslinker is a blocked isocyanate capable of reacting with the hydroxy functional material (I). The block isocyanate may be a polyfunctional isocyanate molecule, prepolymer or urethane resin. Typical isocyanate molecules include tolylene diisocyanate (TDI), 4,4'-diphenyl-methane diisocyanate (MDI) and iso-phorone diisocyanate (IPDI). The block is typically formed by reacting the isocyanate group with a material which prevents reaction of the polyfunctional isocyanate material. Materials having an active hydrogen are useful as blocking agents. These materials include phenols, oximes, amines, imides or polyols, such as the diols and triols described herein. The blocked isocyanate may be a urethane prepolymer or a blocked isocyanate polyurethane. As an alternative, an isocyanate precursor may be used as the blocking agent. The precursors rearrange to form isocyanate under reaction conditions. Nitrile carbonates and aminimides are examples of such isocyanate precursors. Examples of commercially available blocked isocyanate materials include, for example, Vestagon B1530 or Vestagon BF1540 available from Hüls America, Inc.

In another embodiment, the curing agent or crosslinker is a polyester resin having a functional group capable of reaction with the hydroxy functional material (I). The polyesters are obtained by polymerizing polycarboxylic acids or anhydrides with polyhydric alcohols using known methods. Examples of the polycarboxylic acids include terephthalic acid, isophthalic acid, phthalic anhydride, hexahydrophthalic anhydride, fumaric acid, trimellitic anhydride, maleic anhydride, phthalic anhydride, and succinic anhydride. Examples of the polyhydric alcohols include ethylene glycol, propylene glycol, diethylene glycol, glycerol, trimethylol propane, trimethylol ethane, pentaerythritol and bisphenol A. Various polyester resins having functional groups as described herein are commercially available.

In another embodiment, the crosslinker is an aminoplast resin having a functional group capable of reacting with the hydroxy functional material (I). Such resins are generally formed by reaction of an aldehyde with an amino or amido group containing compound. Amino or amido compounds include urea, thiourea, melamine, substituted melamine, guanamines, triaminopyrimidine, 2-mercapto-4,6-diaminopyrimidine, 3,-5-diaminotriazole, carbamyl guanazole, 2,4-diaminothiodiazole, glycouril, 2-oxo,-4,5-diaminoparabanic acid, benzoguanadine or substituted benzoguanadines. Useful aldehydes are formaldehyde, paraformaldehyde, ethanal and butanal, with formaldehyde and paraformaldehyde preferred. The reaction conditions for formation of aminoplast resins are known to those in the art. The compounds formed from the aldehyde and amino or amido containing compounds are typically alkylolamino compounds. A typical example would be the reaction product of reaction of melamine with formaldehyde to form a hexamethyloxymethylmelamine.

Preferred examples of aminoplastic resins include urea-formaldehyde condensates, formaldehyde substituted melamine condensates and benzoguanamine-formaldehyde condensates. Some particularly well-known aminoplastic resins are amino resins sold by American Cyanamid under the trademark Cymelo In particular, Cymel 303 (hexamethoxymethyl-melamine), and Cymel 1156 (n-butoxymelamine), all of which are alkylated melamine-formaldehyde resins. Further melamine formaldehyde resins include Cymel 1116 (methoxyethoxy melamine (mixed ether)), Cymel 1135 (methoxy/n-butoxy melamine) and Cymel 1161 (methoxy/isobutoxy melamine). Benzoguanamines are sold by American Cyanamid as Cymel 1123 (methylethylbenzo-guanamine), 1125 and 1134.

Various urea-formaldehyde resins included herein are available from American Cyanamid and include Beetle 60, Beetle 65 (methylated urea-formaldehyde) and Beetle 80 (butylated urea-formaldehyde). Glycouril based resins include Cymel 1170 (butoxy glycouril), Cymel 1171 (methoxy/ethoxy glycoluril), Cymel 1172 (tetramethylol glycouril and Powdelink 1174 (tetramethoxymethol glycouril. High imino melamine resins include Cymel 323, 325, 327, and 385.

Aminoplastic resins also known as amino resins are described in Kirk Othmer's "Encyclopedia of Chemical Technology", 2d Edition, Vol. 2, pages 440–469 (incorporated herein by reference for its disclosure of amino resins).

In another embodiment, the curing agent or crosslinker is an alkyd resin having a functional group capable of reacting with the hydroxy functional material (I). Such alkyd resins are obtained by reacting a dihydric or polyhydric alcohol (described above) and a polybasic acid or anhydride (described above) in the presence of a drying oil using known techniques. Examples of the drying oils include soybean oil, linseed oil, dehydrated castor oil, nonoxidizing castor and coconut oils, tung oil, oiticica oil, fish oil, sunflower oil, walnut oil, safflower seed oil and tall oil. These alkyd resins may be produced, for example, by direct fusion of glycerol, phthalic anhydride and drying oil at a temperature in the range of from about 210° C. to about 235° C. Solvents are then added to adjust the solids content. The amount of drying oil varies depending on the intended use.

In another embodiment the curing agent or crosslinker comprises a phenolic resin having a functional group capable of reacting with the hydroxy functional material (I). Such phenolic resins, useful as curing agents or crosslinkers, are any of the several types of synthetic thermosetting resins made by reacting a phenol with an aidehyde. Examples of the phenols include phenol, cresols, xylenols, p-t-butyl phenol, p-phenyl phenol, bis-phenols and resorcinol. Examples of the aldehydes include formaldehyde, acetaldehyde and furfural. Phenol-formaldehyde resins are a preferred class of such phenolic resins.

In another embodiment the curing agent or crosslinker comprises a vinyl resin (also sometimes referred to as an allyl resin) capable of reacting with the hydroxy functional material (I). The vinyl resins are formed by the addition polymerization of compounds containing the group $CH_2=CHCH_2-$, such as esters of allyl alcohol and dibasic acids. Generally, they are commercially available as monomers and partially polymerized prepolymers. Examples of such allyl monomers which can be used to form the crosslinker include, diallyl isophthalate, allyl glycidyl ether, allyl succinic anhydride and allyl benzene.

In another embodiment, the curing agents or crosslinkers are polyfunctional acids or anhydrides capable of reacting with the hydroxy functional material (I). The polyfunctional acids or anhydrides include those materials containing two or more equivalents of a carboxyl group or acid anhydride thereof in the molecule. Examples include polyvalent carboxylic acid or anhydride compounds such as phthalic anhydride, isophthalic acid, adipic acid, azelaic acid, succinic acid, sebacic acid, citric acid, itaconic acid, aconitic acid, maleic anhydride, fumaric acid, trimellitic anhydride, hexahydrophthalic acid, tetrahydrophthalic anhydride, dodecenyl succinic anhydride, pimelic acid, pyromellitic anhydride, and polyester resins having two or more carboxyl groups in the molecule which are obtained by esterification of these polyvalent carboxylic acid compounds with polyhydric alcohols.

III. Crystalline Reactive Diluent

The coating composition made in accordance with the present invention includes one or more crystalline reactive diluents. The diluent must be crystalline in nature and it must be capable of forming a chemically covalent link with either the crosslinker (II) or the hydroxy functional material (I). The diluents display a melting point from about 40° to about 240° C. The term "melting point" is used herein in the purely scientific sense. Specifically, melting point means a phase transition from a crystalline state of matter to an amorphous state of matter.

The crystalline reactive diluents provide several new and distinct advantages. Specifically, the crystalline reactive diluent allows for the use of a higher Tg base resin or hydroxy functional material (I) which provides a harder surface and faster setting of the newly applied coating and which without the use of the crystalline reactive diluent would yield a coating having an excessively high viscosity for these types of coating systems. Also, the crystalline reactive diluent provides a separate crystalline phase during printing that facilitates a quicker "set" subsequent to the screen printing operation. The quicker set in turn allows for additional prints or coatings over the first print within the time limits of a production line. Also, the crystalline reactive diluent allows for a lower viscosity melt during the screen printing operation.

The following is a listing of a few examples of crystalline reactive diluents that may be used in conjunction with the present invention.

| Name | Functionality |
|---|---|
| Dimethyl hexanediol | dihydroxy |
| 1,6-Hexanediol | dihydroxy |
| 2,5-Dimethylhexane-2,5-diol | dihydroxy |
| 1,12-Octadecanediol | dihydroxy |
| Styrene glycol | dihydroxy |
| Dimethyl tartrate | diester and dihydroxy |
| Stearolic acid | mono-acid |
| 1,10-Decanediol | dihydroxy |
| Dimethyl fumarate | diester |
| 1,12-Dodecanedioic acid | diacid |
| Glutaric acid | diacid |
| 2,2'-Dimethyl adipic acid | diester |
| 1,4-Dimethyl cyclohexanol | dihydroxy |
| Azelaic acid | diacid |
| 3,3',4,4'-Benzophenonetetracarboxylic acid anhydride (BTDA) | dianhydride |
| Hydrogenated bisphenol-A | dihydroxy |
| Di-trimethylolpropane | tetrahydroxy |
| 2,2,4-Trimethyl-1,3-pentanediol (TMPD glycol) | dihydroxy |
| 2,2-Dimethyl-1,3-propanediol (NPG glycol) | dihydroxy |
| 'SL-20' Dicarboxylic acid | diacid |
| 'Piothane 1000 CA-A' Polyester Polyol from Pioneer Products | diacid |
| 'Piothane 2000 CA-A' Polyester Polyol from Pioneer Products | diacid |
| 'Piothane 1000 CA' Polyester Polyol from Pioneer Products | dihydroxy |

-continued

| Name | Functionality |
|---|---|
| 'Piothane 2000 CA' Polyester Polyol from Pioneer Products | dihydroxy |
| 'Witco DA66-56' Polyester Resin | dihydroxy |
| 'Witco DA22-56' Polyester Resin | dihydroxy |
| 'Witco DA22-112A' Polyester Resin | diacid |
| 'Witco DA66-112A' Polyester Resin | diacid |
| Naphthalene dicarboxylic acid | diacid |
| 4,4'-Oxydiphthalic anhydride | dianhydride |
| Lauric anhydride | anhydride |
| Bis-(2-hydroxyethyl)terephthalate | dihydroxy |
| 2-Butyl-2-ethyl-1,3-propanediol (BEPD) | dihydroxy |
| 1,4-Cyclohexanedimethanol (CHDM) | dihydroxy |
| 3-Hydroxy-2,2-dimethylpropyl-3-hydroxy-2,2-dimethylpropanoate (HPHP) | dihydroxy |
| Hydroquinone | dihydroxy |
| Di-methylnaphthalene dicarboxylic acid | diester |

IV. Catalyst

The coating composition preferably contains one or more catalysts to facilitate the crosslinking reaction between the hydroxy functional material (I) and the crosslinker (II). Useful catalysts include heavy metal salts of organic acids such as stannous carboxylic acid salts including stannous octoate and stannous stearate; tertiary or quaternary amines and their halides such as trimethylbenzylammonium chloride and 2-methylimidazole; other metal catalysts such as dibutyltin-dilaurate; blocked sulfonic acids such as blocked dinonylnaphthalene sulfonic acid catalysts; blocked acids and other bronsted acids; and complexed Lewis acids. Further examples of specific catalysts are the Nacure series available from King Industries under the designations 155, 3525, 3300, X49-110, 1419, 1323, 3327, 4054 and 1040, manganese acetate and boron trifluoride complexes.

V. Plasticizer

The coating composition of the present invention may also include one or more plasticizers. Such plasticizers include adipates, phosphates, phthalates, sebacates, polyesters derived from adipic acid or azelaic acid, and epoxy or epoxidized plasticizers. Some of these plasticizers are adipates such as di(n-hexyl) adipate, diisooctyl adipate, dicyclohexyl adipate; phosphates such as triphenylphosphate, tricresylphosphate, tributylphosphate, phthalates such as dibutylphthalate, dioctyl phthalate and butyl octyl phthalate, sebacates such as dioctyl sebacate, butyl benzyl sebacate and dibenzyl sebacate.

VI. Rheology Modifier

The coating composition of the present invention may also include one or more rheology modifiers or flow control agents. Examples of rheology modifiers include poly(lauryl acrylate), polybutyl acrylate, poly(2-ethylhexyl) acrylate, poly(lauryl methacrylate), polyisodecenyl methacrylate, fluorinated polymers such as an ester of polyethylene glycol or polypropylene glycol and fluorinated fatty acids, for example, an ester of polyethylene glycol of a molecular weight of over 2500 and perfluorooctanoic acid. Polymeric siloxanes of molecular weights over about 1000 may also be used, for example, poly(dimethylsiloxane) or poly(methylphenyl) siloxane or organo-silicones such as, for example, OSI L-7602, OSI L-7500 or OSI L-77.

VII. Wax

The coating composition of the present invention may also include one or more waxes. The waxes can be used to facilitate release of the screen during printing and to improve print definition. Suitable waxes include, for example, animal waxes such as bees wax, spermaceti wax, Chinese insect wax and shellac wax; vegetable waxes such as carnauba wax, candelilla wax, hydrogenated castor oil, ovricury wax, Japan wax bayberry wax; mineral waxes such as peat wax, montan wax, ozocerite wax and petroleum waxes; and synthetic waxes such as low molecular weight polyethylenes and oxidized hydrocarbon waxes. The synthetic or modified natural waxes may or may not contain polar functional groups such as carboxylic acids, carboxylic acid anhydrides and esters, hydroxyl, aldehyde ketone, oxirane, sulphonic acids or esters and phosphate esters.

VIII. Pigments

The coating composition of the present invention includes one or more coloring agents or pigment. The pigments may be organic or inorganic and functionally contribute to opacity and color in addition to durability and hardness, although some coating compositions made in accordance with the present invention may contain little or no opacifying pigments and may thus be described as clear coatings. Pigments ordinarily can include opacifying pigments such as, for example, titanium dioxide, zinc oxide, leaded zinc oxide, as well as tinting pigments such as carbon black, yellow oxides, brown oxides, tan oxides, raw and burnt sienna or umber, chromium oxide green, phthalocyanine blue and green, phthalonitrile blue, ultramarine blue, cadmium pigments, chromium pigments, and the like. Filler pigments such as, for example, clay, silica, talc, mica, wollastonite, wood flower and the like can also be included in the coating composition.

IX. Miscellaneous Additives And Fillers

The coating composition of the present invention may also include miscellaneous additives and fillers. Fillers include such materials, for example, as calcium carbonate and talc. Additives include for example, surfactants and stabilizer-type additives such as UV absorbing agents and antioxidants. Examples of specific stabilizers include Tinuvin and Irganox stabilizers available from Ciba-Geigy. Potential surfactant additives include the alkylene oxide treated products such as ethylene oxide treated phenols, alcohols, esters, amines and amides. Additional surfactants include ethylene oxide-propylene oxide block copolymers, and glycerol esters and sugar esters.

Preparation Of The Coating Composition

The coating composition is preferably prepared by mixing the various components in a heated container which includes mixing capability. For example, a heater Myers mixer or even a heated three roll mill could be utilized. The components are preferably heated from about 80° C. to about 120° C. and thoroughly mixed. The mixture is then cooled to solid form preferably at a temperature below about 40° C.

Proportions

The coating composition made in accordance with the present invention comprises a polymeric binder portion. The polymeric binder portion is that portion of the coating composition which comprises the hydroxy functional materials (I) and the crosslinkers (II). The polymeric binder does not include the crystalline reactive diluents (III), catalysts (IV), plasticizers (V), rheology modifiers (VI), waxes (VII), coloring agents (VIII) or other materials.

The coating composition made in accordance with the present invention includes by weight from about 20% to about 98% polymeric binder, from about 2% to about 40% one or more crystalline reactive diluents (III), up to about 10% of one or more catalysts (IV), up to about 15% of one or more plasticizers (V), up to about 10% of one or more rheology modifiers, up to about 10% of one or more waxes and up to about 60% of one or more coloring agents. Preferably, the coating composition comprises by weight from about 40% to about 85% polymeric binder, from about 5% to about 35% of one or more crystalline reactive diluents (III), from 0.5% to about 10% of one or more catalysts (IV), from about 0.1% to about 10% of one or more plasticizers (V), from about 0.1% to about 10% of one or more rheology modifiers (VI), from about 0.1% to about 10% of one or more waxes (VII), and up to about 55% of one or more coloring agents.

The polymeric binder comprises in weight percent from about 20% to about 80% of one or more hydroxy functional materials (I) and from about 20% to about 80% of one or more crosslinkers (II) Preferably, the polymeric binder comprises in weight percent from about 30% to about 70% of one or more hydroxy functional materials (I), and from about 25% to about 65% of one or more crosslinkers (II). It will be appreciated that the present invention contemplates a situation wherein the polymeric binder comprises a self-curing resin as disclosed in Labana et al. U.S. Pat. No. 3,787,340. In such self-curing resins the hydroxy functional material and the crosslinker are a single copolymer and are thus not readily physically distinguished. The '340 patent is incorporated herein by reference for its teachings of how to make a self-curing polymeric binder.

Use Of The Coating Composition

The coating composition is preferably applied by heating the composition and then squeegeeing it through a heated screen of fine metal wires onto a substrate. Preferably, the coating composition is heated in the range of from about 70° C. to about 160° C. prior to application to the substrate. Various substrates comprising glass or ceramic materials may be coated. Additionally, rigid substrates comprising metal, plastic, textile, fibreboard or other materials may also be coated with the coating composition of the present invention. The present coating composition is particularly well suited for use in the beverage or food container industry wherein containers are decorated in one or more colors at high speeds and subjected to rigorous handling conditions including high speed conveyor lines, pasteurization steps and cleaning operations.

Once applied to the substrate that is to be decorated, the coating material is cooled so as to solidify the coating material (for example, cooled to a range of from about 0° C. to about 50° C.). The coating composition can then immediately be overprinted with additional layers of coating material. After all the desired layers of coating material have been applied, the decorated object is then heated to a temperature of from about 150° C. to about 250° C. so as to promote the final cure (crosslinking) of the coating compo-sition. After curing the decorated object may be cooled to room temperature (i.e., below 40° C.) and utilized as intended.

EXAMPLES

The present invention will be more fully understood from the following illustrative examples wherein all quantities, percentages and ratios are on a weight basis unless otherwise indicated. The following examples show the preparation of various coating compositions in accordance with the present invention.

Example I

| COATING COMPOSITION | |
|---|---|
| Component | Weight |
| Polyester hydroxyl resin (30-3011 McWhorter Chemical) | 30.34 |
| Epoxy functional crosslinker (DER-661 Dow Chemical) | 23.60 |
| Crystalline reactive diluent (Hydrogenated bisphenol A Ken-Seika Co.) | 13.49 |
| Titanium dioxide pigment | 8.09 |
| Red pigment | 8.11 |
| Plasticizer (Surfadone LP-300 ISP Technologies) | 6.74 |
| Catalyst (Nacure 1419 King Industries) | 3.36 |
| Catalyst (Cata-Chek 820 Ferro Corporation) | 3.36 |
| Silica rheology modifier (R-202 Degussa) | 0.94 |
| Pigment dispersant (BYK-405 Mallinkrodt) | 0.67 |
| Surface active agent (L-7500 OSI Co.) | 0.67 |
| Pigment dispersant (BYK-P104 BYK-Mallinkrodt) | 0.36 |
| Wax (Polywax 2000 Petrolite) | 0.27 |
| Total: | 100.00 |

Example II

| Coating composition | |
|---|---|
| Component | Weight |
| Polyester hydroxyl resin (30-3008 McWhorter Inc.) | 30.38 |
| Epoxy functional crosslinker (DER-661 Dow Chemical) | 23.63 |
| Titanium dioxide pigment | 20.24 |
| Crystalline reactive diluent (Hydrogenated bisphenol A Ken Seika Co. | 10.12 |
| Crystalline reactive diluent (DA22-56 Witco) | 3.37 |
| Catalyst (Nacure 1419 King Ind.) | 3.37 |
| Catalyst (Cata-Chek 820 Ferro Corporation) | 3.37 |
| Silica rheology modifier (R-202 Degussa) | 2.36 |
| Plasticizer (Surfadone LP-300 ISP Technologies Inc.) | 1.69 |
| Wax (Taber 75 Shamrock Industries) | 1.00 |

-continued

Example II (continued)

| Coating composition | |
|---|---|
| Component | Weight |
| Pigment dispersant | 0.47 |
| BYK-P104 BYK Mallinkrodt) | |
| Total | 100.00 |

Example III

| Coating Composition | |
|---|---|
| Component | Weight |
| Polyester hydroxyl resin (30-311 McWhorter, Inc.) | 26.33 |
| Epoxy functional crosslinker (DER-661 Dow Chemical) | 26.33 |
| Titanium dioxide pigment | 19.75 |
| Crystalline reactive diluent (Hydrogenated bisphenol A Ken-Seika Co.) | 13.17 |
| Plasticizer (Surfadone LP-300 ISP Technologies, Inc.) | 6.60 |
| Silica rheology modifier (R-202 Degussa Inc.) | 2.30 |
| Catalyst (Nacure 1419 King Industries) | 2.30 |
| Catalyst (Cata-Chek 820 Ferro Corporation) | 2.30 |
| Pigment dispersant (BYK-P104 BYK Mallinkrodt) | 0.66 |
| Wax | 0.26 |
| (Polywax 2000 Petrolite) | |
| Total | 100.00 |

Example IV

| Coating Composition | |
|---|---|
| Component | Weight |
| Polyester hydroxyl resin (30-3011 McWhorter Inc.) | 27.05 |
| Acid functional crosslinker (Acrylic SCX-815B S.C. Johnson) | 6.52 |
| Titanium dioxide pigment | 23.44 |
| Plasticizer (Palatinol 711-P BASF Corp.) | 3.67 |
| Crystalline reactive diluent (Dodecanedicarboxylic acid DuPont) | 20.47 |
| Crystalline reactive diluent (Bis-hydroxyethylterephthalate ICI) | 12.92 |
| Silica rheology modifier (R-202 Degussa) | 3.21 |
| Catalyst (Cata-Chek 820 Ferro Corporation) | 1.35 |
| Wax | 1.37 |
| (Polywax 2000 Petrolite) | |
| Total | 100.00 |

Example V

| Coating Composition | |
|---|---|
| Component | Weight |
| Polyester hydroxyl resin (30-3011 McWhorter, Inc.) | 33.19 |
| Acid functional crosslinker (Acrylic SCX-815B S. C. Johnson) | 8.05 |
| Titanium dioxide pigment | 1.64 |
| Crystalline reactive diluent (Glutaric acid ICI) | 5.02 |
| Crystalline reactive diluent (Dodecanedicarboxylic acid DuPont) | 20.12 |
| Crystalline reactive diluent (Bis-hydroxyethylterephthalate ICI) | 15.11 |
| Red pigment | 6.59 |
| Plasticizer (Palatinol 711-P) | 3.29 |
| Silica rheology modifier (R-202 Degussa) | 1.64 |
| Catalyst (Cata-Chek 820 Ferro Corporation) | 2.30 |
| Wax (Polywax 2000 Petrolite) | 1.23 |
| Wax (Aramid 18 Akzo) | 1.64 |
| Surface active agent | 0.18 |
| (L-7602 OSI) | |
| Total | 100.00 |

What is claimed:

1. A method of decorating a substrate comprising the steps of:
   A. Providing a coating composition comprising:
      I. a polymeric binder comprising a hydroxy functional material (I) and a crosslinker (II), said polymeric binder comprising from about 20% to about 80% by weight said hydroxy functional material;
      II. at least one crystalline reactive diluent (III), said crystalline reactive diluent comprising a crystalline material capable of forming a chemically covalent link with at least one of said hydroxy functional material (I) or said crosslinker (II);
   B. Heating said coating composition to a temperature of from about 70° C. to about 160° C.;
   C. Screen printing said coating composition upon a substrate so as to coat at least a portion of said substrate;
   D. Cooling said applied coating composition so as to solidify the coating composition; and
   E. Heating said coating composition to a temperature of from about 150° C. to about 250° C. so as to cure said coating composition.

2. A method as set forth in claim 1 including the step of screen printing a second coat of said coating composition upon said substrate subsequent to said step D.

3. A method as set forth in claim 1 including the steps of providing a second coating composition having a different composition from said first coating composition comprising:
   I. at least one hydroxy functional material (I);
   II. at least one crosslinker (II); and
   III. at least one crystalline reactive diluent (III); and screen printing a coat of said second coating composition over said coat of said first coating composition subsequent to said step D.

4. A method as set forth in claim 3 wherein said hydroxy functional material (I) comprises a material selected from the group consisting of a polyester resin, an acrylic resin, a polyurethane resin and a mixture of two or more thereof.

5. A method as set forth in claim 3 wherein said crosslinker (II) comprises a material capable of reacting with the hydroxy functional material selected from the group consisting of an epoxy resin, an acrylic resin, a polyester resin, an aminoplastic resin, an alkyd resin, a phenolic resin, a vinyl resin, a polyfunctional resin, an anhydride resin, and a mixture of two or more thereof.

6. A method of decorating a substrate comprising the steps of:
   A. Providing a coating composition having a polymeric binder comprising:
      I. at least one hydroxy functional polyester resin;
      II. at least one crosslinker comprising an epoxy resin; and
      III. at least one crystalline reactive diluent, said crystalline reactive diluent comprising a crystalline material capable of forming a chemically covalent link with at least one of said crosslinker or said hydroxy functional polyester resin, said polymeric binder comprising from about 20% to about 80% by weight said hydroxy functional polyester;
   B. Heating said coating composition to a temperature of from about 70° C. to about 160° C.;
   C. Screen printing said coating composition upon a substrate so as to coat at least a portion of said substrate;
   D. Cooling said applied coating composition so as to solidify the coating composition; and
   E. Heating said coating composition to a temperature of from about 150° C. to about 250° C. so as to cure said coating composition.

* * * * *